Dec. 3, 1935. A. B. MERRILL 2,023,280
RESILIENT CONSTRUCTION UNIT
Filed Aug. 3, 1933
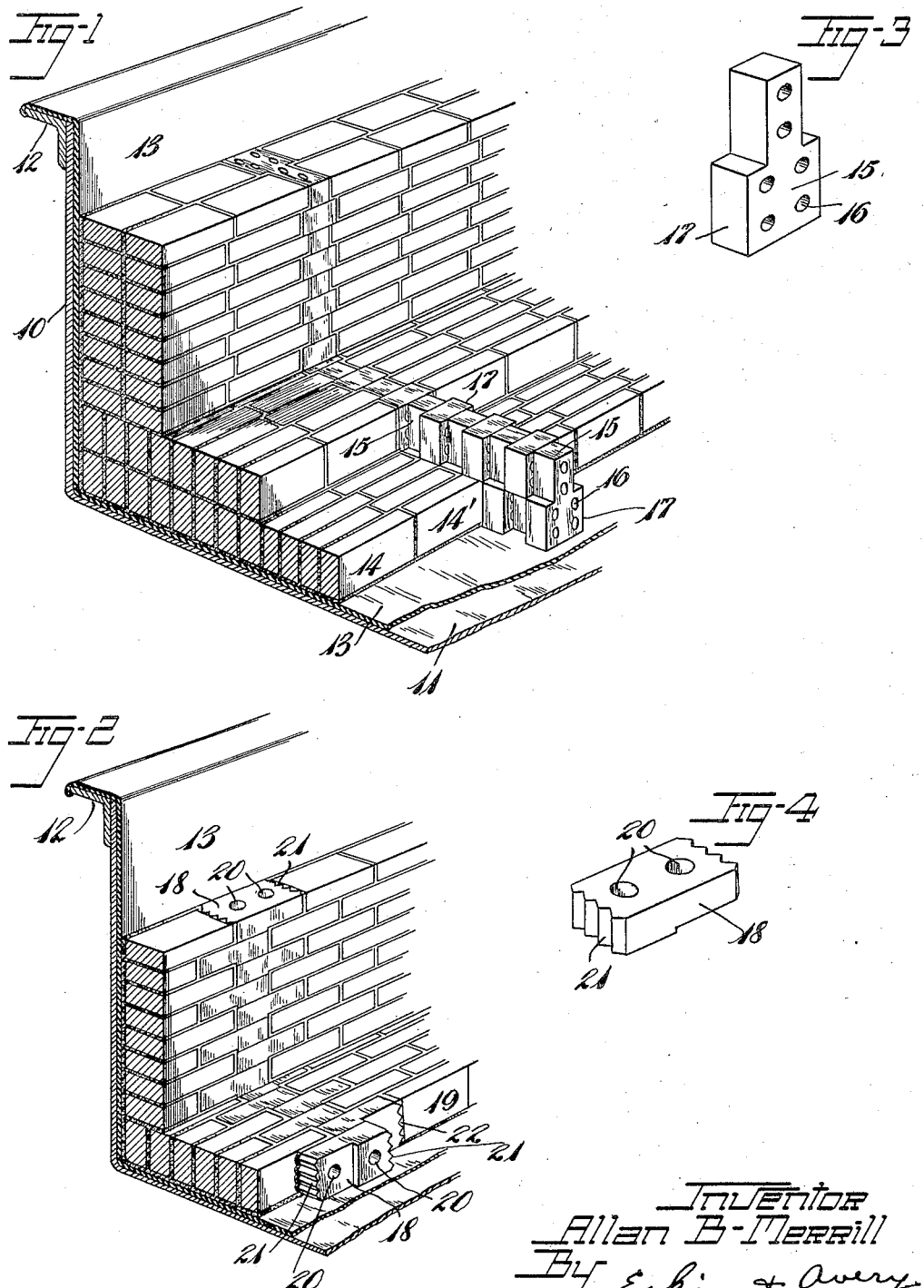
Inventor
Allan B. Merrill
By Eakin + Avery
Attys- Patented Dec. 3, 1935

2,023,280

UNITED STATES PATENT OFFICE 2,023,280

RESILIENT CONSTRUCTION UNIT

Allan B. Merrill, Akron, Ohio, assignor to The B. F. Goodrich Company, New York, N. Y., a corporation of New York Application August 3, 1933, Serial No. 683,466

1 Claim. (Cl. 72—14)

This invention relates to resilient construction units for masonry structures and is especially useful in the manufacture of corrosion resistant masonry structures for tank linings, floors, and the like.

It has been the practice to construct linings for pickling tanks and similar devices, where fluids are to be maintained at high temperatures, with resilient rubber linings. Such linings are limited in their use to certain ranges of temperature, especially where the fluid used reacts with the lining at high temperatures.

In Fritz U. S. Patent 1,899,413 it was proposed to protect such rubber linings from high temperatures and also from mechanical injury by applying a protective layer of brick over the rubber lining.

It is also the practice to construct certain tanks without rubber linings using a lining of tile or brick set in a thermoplastic sulfur-silica mixture or other rigid-setting cement.

In either case it has been found that where the tanks or other structures exceed a certain length some provision should be made to compensate for the expansion and contraction of the rigid masonry in addition to any rubber lining present.

The principal objects of this invention are to provide resilient means for compensating for expansion, and to provide such means in convenient form to be easily installed.

Other objects will appear from the following description and the accompanying drawing.

In the drawing:

Fig. 1 is a perspective view of a section of a tank showing one form of the invention.

Fig. 2 is a similar view showing a modified form of the invention.

Fig. 3 is a perspective view of a single expansion unit as used in Fig. 1.

Fig. 4 is a perspective view of a single expansion unit as used in Fig. 2.

Referring to the drawing, the tank shown in Fig. 1 is formed with a wall 10 and floor 11 of sheet metal, the walls being reinforced by an angle-iron rim 12. A rubber lining 13, of any well known construction, extends over the walls and floor to protect the metal from corrosive fluids. Inside the rubber lining is a protective lining of brick 14 laid in two courses, the brick being laid in suitable cement.

The brick protective lining is built in sections, two sections being shown, separated by a resilient expansion joint. The joint is constructed of resilient rubber bricks 15, each having at least one impervious acid-resistant face, and each comprising a body of vulcanized rubber of such thickness as to exceed the thickness of the rigid bricks by one thickness of mortar and thereby to permit the rubber bricks being laid face to face without mortar. The rubber bricks are preferably made of enlarged width at one end so as to permit staggering of the rigid brick in successive courses to lock both the resilient and rigid bricks in place. Where it is desired to provide for volume compressibility of the resilient unit, apertures 16 may be formed therein to permit flow of the rubber under compression.

In laying the structure shown in the drawing the resilient brick are coated with rubber cement and laid in contact with each other to provide a continuous expansion joint extending between the rigid brick and completely dividing the brick structure into sections. The enlarged ends 17 of the resilient units are laid in alternate directions, the first one with the large end down and the second with the large end up, so as to provide an interlocking structure. The adjacent rigid bricks may be laid progressively as the expansion joint is built or after it is completed. The bricks 14' immediately adjacent the rubber units are primed with rubber cement so as to adhere to the resilient units.

The single course structure shown in Fig. 2 is constructed in a similar manner using a resilient expansion unit of the form illustrated in Fig. 4. This unit 18 is substantially equal in dimensions to the rigid brick 19 but is made thicker throughout half its extent and wider throughout its extent by the thickness of a mortar joint so as to make contact with the adjoining resilient unit when laid in the joint. Where volume compressibility is desired apertures 20 are formed in the unit. In order to provide additional locking of the resilient unit to the rigid masonry structure the ends of the unit may be provided with serrations 21 which interlock with mortar 22 on the adjacent bricks.

I claim:

An expansion joint for use between rigid brick structures, said joint comprising a plurality of resilient rubber bricks in engagement with each other, each rubber brick being thickened at one end, the thinner ends of successive rubber bricks extending in opposite directions.

ALLAN B. MERRILL.